United States Patent [19]

Davis, Jr.

[11] 4,131,505
[45] Dec. 26, 1978

[54] ULTRA-SONIC HORN

[75] Inventor: Paul H. Davis, Jr., St. Charles, Ill.

[73] Assignee: DuKane Corporation, St. Charles, Ill.

[21] Appl. No.: 859,919

[22] Filed: Dec. 12, 1977

[51] Int. Cl.$^2$ .......................... B23K 1/06; B29C 27/08
[52] U.S. Cl. ............................... 156/580.1; 156/580.2; 156/581; 228/1 R; 310/323
[58] Field of Search ................. 156/73.1, 580.1, 580.2, 156/581; 228/110, 1 R; 264/23; 425/174.2; 116/137 A; 310/322, 323

[56] References Cited

U.S. PATENT DOCUMENTS

| 3,113,225 | 12/1963 | Kleesattel et al. | 310/323 X |
| 3,419,447 | 12/1968 | Hewitt | 228/1 |
| 3,464,102 | 9/1969 | Soloff | 156/73.1 X |
| 3,483,066 | 12/1969 | Harris et al. | 228/1 |
| 3,601,084 | 8/1971 | Biro et al. | 156/73.1 X |
| 3,661,661 | 5/1972 | Berleyoung | 156/73.1 X |
| 3,939,033 | 2/1976 | Grgach et al. | 156/580.2 X |

FOREIGN PATENT DOCUMENTS 1590644 5/1970 France .......................................... 228/1

OTHER PUBLICATIONS

Stafford, R. D., *Ultrasonics for Industry*, Published by Life Science & Tech. Publications Ltd., (1970), pp. 9 and 11.

*Primary Examiner*—Michael G. Wityshyn
*Attorney, Agent, or Firm*—Vogel, Dithmar, Stotland, Stratman & Levy

[57] ABSTRACT

A large solid horn has an energy output and an energy input. The output is useful for application to a load. The horn is provided with a groove in the horn side surface about the horn axis and is preferably located nearer the output end thereof. This groove functions to correct fall off in amplitude of sonic energy at or near the outer edge portion of the horn output end.

11 Claims, 6 Drawing Figures

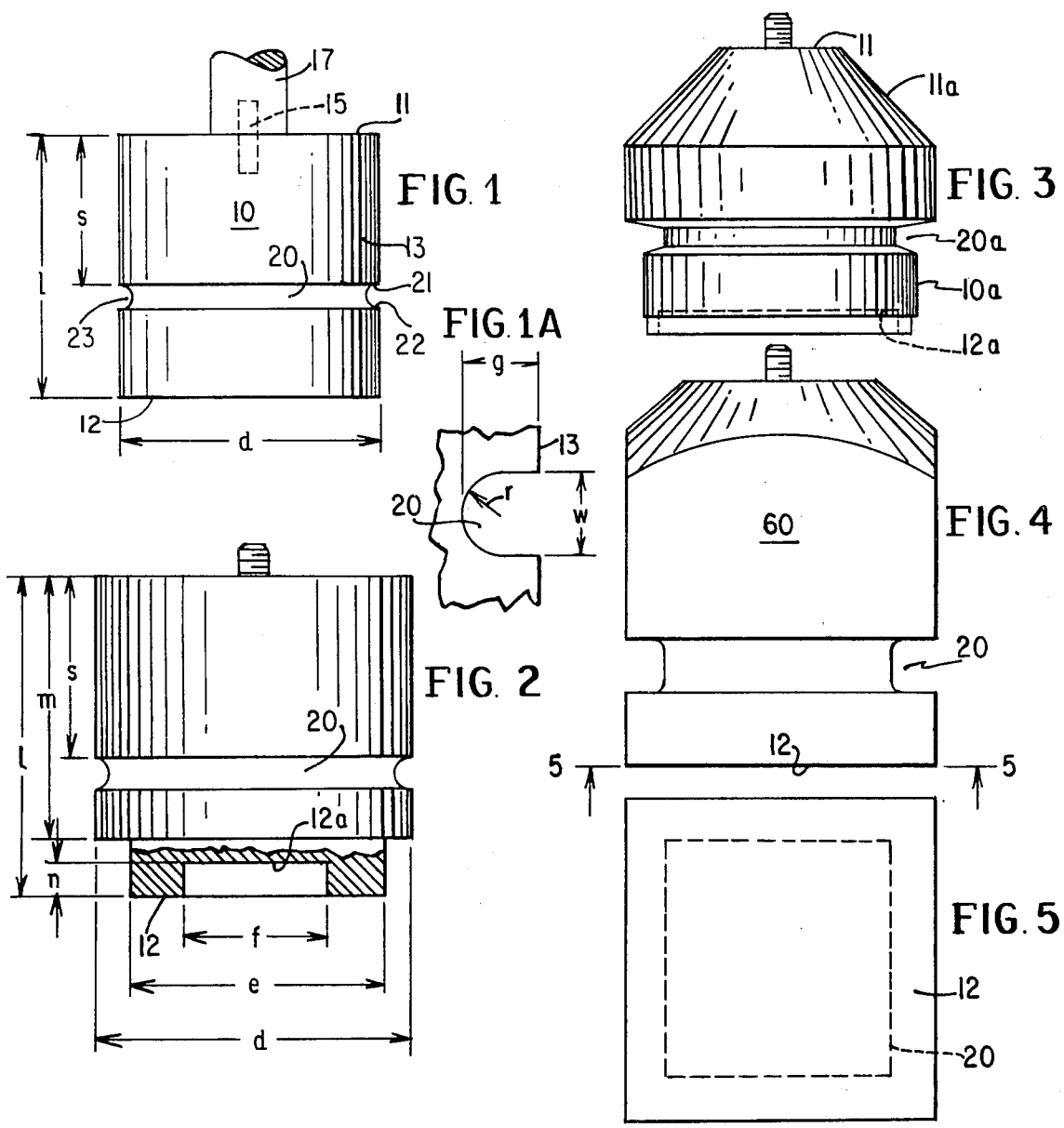
5" DIAMETER "ACCORDION" HORNS-GROOVE LOCATION VS AMPLITUDE DISTRIBUTION ON OUTPUT SURFACE.
ALUMINUM HORNS — 20 kHz — GROOVE .500" W. X .375" DEEP.
TRANSDUCER OUTPUT AMPLITUDE = .0006"
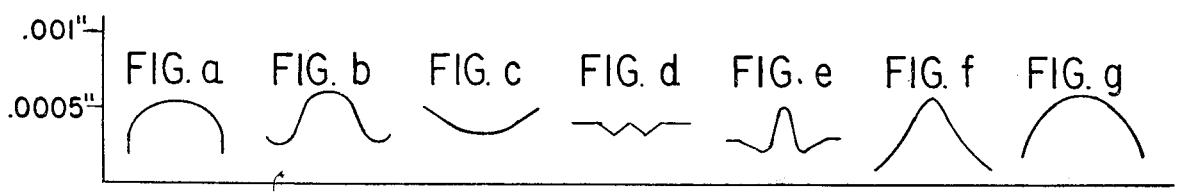

ULTRA-SONIC HORN

SPECIFICATION

Introduction

This invention relates to the output portion of a large solid horn. Such a horn may have a substantial drop in amplitude of sonic energy at peripheral zones of the horn. As an example, a 20 kHz resonant aluminum horn having a generally flat circular output working area whose diameter may be about 5 inches suffers a severe reduction in amplitude of sonic energy at the outer part of the horn output. It is generally believed that interfering vibration modes are responsible. As a result, it is impossible to provide uniformly satisfactory plastic welds near the outer limits of the horn output face.

PRIOR ART

Where a plastic weld area is circular or generally rectangular with the dimensions on the general order of from about 4 inches to as much as 7 inches for about 20 kHz frequency, a horn may have a generally flat work surface normally fashioned from a metal cylinder or rectangular rod having the requisite dimension. Normally a horn blank will be a solid rod having desired length and transverse dimension or dimensions at least somewhat greater than the final horn dimensions. While many metals and alloys may be used for making horns, such considerations as sonic properties, cost, market availability in various shapes and sizes, ease of machining and long useful life of a finished horn all combine to channel horn manufacturers into using aluminum alloys specially heat treated or titanium alloys as an alternative. The present invention will be discussed in connection with aluminum and titanium alloys. It is understood that other metals and alloys may be used.

In the case of horns made from round or square rod stock whose transverse dimension or dimensions are on the general order of from at least about 4 inches to about 7 inches and are to be used on the order of about 20 kHz, substantial transmission difficulties occur resulting in non-uniform distribution of sonic energy over the work face of the horn. Where plastic welding along a circular ring having a radius as above indicated is required, or a comparable closed figure for non-circular plastic welds are involved, such expedients as hollowing out the horn metal to provide a bell-shaped structure having longitudinal slots through the bell wall and extending along the length of the bell have been used. Machining to provide the above horn structures is time-consuming and costly. It should also be noted that the slots often serve as undesirable stress concentrators and slotted horns may fail in service due to cracks developing around the ends of the slots and in the web of metal between the ends of the slots and the end of the horn.

ADVANTAGES OF THE PRESENT INVENTION

By using the present invention in the manufacture of a large solid horn, it is possible to obtain increased amplitude of ultrasonic energy in the peripheral area of the output work face of such a large horn. Thus, the invention makes it possible to provide a horn whose distribution of energy amplitude is more desirable than previously considered obtainable without the use of slotting or other expensive machining operations.

THE INVENTION GENERALLY

The invention generally contemplates providing a groove in the outer surface of a large solid horn operating at a frequency on the general order of about 20 kHz, said groove extending about the body of the horn and spaced from the horn output end. The spacing from the horn output end is at least ¼ of an inch, and while the location of the groove along the horn length may vary, it is preferred to locate the groove generally about the middle zone of the horn length or lower toward the output end of the horn. The width and depth of the groove is small in comparison to a quarter wavelength at the operating frequency.

The location of the horn groove is preferably in the lower portion of the large horn, the beneficial effects of the groove being reduced substantially if such groove is located in the upper (closer to the horn input end) part of the horn. The groove is continuous about the horn and may be up to about ½ inch in depth. It is preferred to have the groove depth less than about ½ inch to insure stability of operating characteristics and to this end, a ⅜ inch depth is preferred. Reducing the groove depth to below about ¼ inch tends to reduce the benefits obtainable. The groove width should not be too small, otherwise undesired stresses may be present during operation. In general, the groove width should be no less than about ¼ of an inch and a practical and desirable range of groove width may vary from about ¼ of an inch to about 1 inch. A convenient range of groove widths may be from about ⅜ of an inch to about ½ inch.

DESCRIPTION OF DRAWINGS

Reference will now be made to the drawings wherein exemplary embodiments of the invention are shown and wherein FIGS. A to G and a to g are charts and amplitude curves.

FIG. 1 is an elevation of a cylindrical ultrasonic horn embodying the present invention.

FIG. 1A is an enlarged detail of a grooved portion of such horn.

FIG. 2 is an elevation of a horn similar to that shown in FIG. 1, but having a shallow relief in the output portion of the horn.

FIG. 3 is an elevation of a modified cylindrical horn.

FIG. 4 is an elevation of a rectangular ultrasonic horn embodying the present invention.

FIG. 5 is a bottom view of FIG. 4.

DESCRIPTION OF THE INVENTION

The invention is applicable to large solid horns for half wavelength resonance on the order of 20 kHz having a desired direction of acoustic energy travel along the horn length, and having a transverse dimension or dimensions of from about 4 inches to about 7 inches. Such horns are useful for plastic welding. While the invention may be applicable to metal horns generally, it is convenient to discuss the application of the invention to and its advantages in connection with titanium or hardened aluminum alloys, both well-known and widely used in this art.

Referring to FIG. 1, 10 is a large horn having sonic energy input end 11 and output end 12. Horn 10 has outer cylindrical surface 13. Horn 10 may, if desired, have a circular, curvilinear or other suitable cross section. Horn input end 11 has a tapped recess 15 extending axially of the horn for accommodating a bolt portion of coupling member 17. Coupling member 17 may be part of a transducer or horn of suitable length for feeding longitudinally directed acoustic energy into horn 10. It is understood that tapped recess 15 and the coupling bolt portion for member 17 is sufficiently long and extends sufficiently deep into the body of horn 10 for proper transmission of sonic energy. As an example, horn 10 when made of aluminum alloy, can have a diameter d of about 5 inches and an overall length l of 3.920 inches.

A simple large cylindrical horn without an annular groove along the body of the cylinder will ordinarily have little if any usable amplitude of longitudinal vibration near the outer portion of output end 12. Substantially, all of the acoustic energy available for work at the output end 12, will be concentrated about a central circular region having a radius less than about ⅛ or ¼ of an inch, the amplitude falling off sharply as the outer face 13 of the horn is approached. This loss of acoustic energy at the output end of the horn may be due to internal interference, reflection patterns or other obscure phenomena. At any rate, a simple massive horn 10 without further change in its structure is practically useless for welding plastic in an annular region such as might be required when providing or creating a ring-shaped weld concentric with the axis of horn 10 but having an inner radius of about 1.5 or 2 inches and an outer radius ranging from 1-¾ inches to about 2-¼ inches.

I have discovered that providing an annular groove 20 about horn 10 and located away from output end 12 at least about ¼ of an inch and preferably located no more than about ½ of the horn length from output end 12 provides unexpected characteristics to the horn and, in particular, greatly enhances the amplitude of vibration of the outer portion of the horn output end 12. Groove 20 may have any desired width w within the preferred range, and in the exemplary horn discussed, a ¼ inch width was used. This dimension extends generally parallel to the axis of horn 10. Groove 20 has sidewalls 21 and 22 and a bottom rounded portion 23. Sidewalls 21 and 22, in the form illustrated in FIG. 1, extend in parallel planes perpendicular to the horn axis but in a modification later discussed, such sidewalls may diverge outwardly. Curved bottom groove portion 23 may have a circular outline of radius r as seen in elevation but may deviate from that. The maximum groove depth g should be less than ¼ inch to avoid instability of operation and in practice a depth of ⅛ of an inch is highly desirable in improving the transmission of energy to the output end face of the horn.

Referring now to FIGS. A to G inclusive, and to FIGS. a to g inclusive, characteristic curves are shown in the lower case letters corresponding to groove locations A to G inclusive, these capital letter charts showing the location of grooves having a ¼ inch width and a ⅛ inch depth as illustrated in FIG. 1. In these curves, the transducer output amplitude was 0.0006 inches. As shown in the lower case curves a to g inclusive, the amplitude distribution along the output end of a 5 inch diameter aluminum horn was generally poor along part of the output end near the outer edge or region for horn configurations in FIGS. A and G. Horn configurations shown in FIG. B. show some improvement along the outer edge of the output end. The horn configuration shown in FIG. C shows an excellent amplitude at the outer edge of the output end of the horn with a substantial portion of the inner area of the horn output having reduced amplitude. The horn configuration showing the location of the groove in FIG. D shows an even better disposition of the longitudinal acoustic amplitude in the outer area of the output end. Elevating the groove still further from the output end of the horn, as shown in FIG. E, produces an energy distribution as illustrated in FIG. e. This may have some specialized applications.

Moving the groove higher from the output end and thus closer to the input end of the horn, as shown in FIGS. F and G, produces, what for many purposes would be undesirable distribution of acoustic energy in the outer annular portion of the output end of the horn. It is clear that the disposition of the groove along the horn length from the output to the input end provides a variety of operating characteristics which are surprising in their differences and which make it possible to custom-tailor a horn for providing a wide range of desired output characteristics. In all instances, the groove was ¼ inch wide and ⅛ inch deep. The operating characteristic illustrated in FIG. c corresponding to groove location FIG. C substantially corresponds to the horn structure of FIG. 1.

MODIFICATIONS

FIG. 2 shows that the horn construction is generally similar to that illustrated in FIG. 1, except that the output end 12 has a reduced diameter portion which is relieved or cut away at 12a to provide possible clearance for embossing or other parts of the plastic or other elements on the plastic so as not to injure or deform anything that has previously been applied to the plastic within an annular region to be welded.

It should be noted that because of the application of this invention to the horn and selecting the appropriate location of the groove to the horn, the provision of the relief region at 12a of the output end need not impair or interfere with the proper and desired operation of the horn.

Referring now to FIG. 3, a modified horn construction 10a is illustrated. This horn has energy input end 11 with a bolt portion for connection to a transducer or similar source of energy. Input end 11 has tapering portion 11a directed to horn portion 10a. This horn has a relieved output region 12a similar to that of FIG. 2. In addition, groove 20a has its sides tapering outwardly as previously suggested. By virtue of the location of groove 20a, the desired output characteristics of this horn may be obtained as previously suggested in connection with FIGS. A to G inclusive, and FIGS. a to g inclusive.

Referring to FIGS. 4 and 5, horn 60 having a generally rectangular cross section is shown. This horn may have its output end similar to that of FIG. 1 or have a transformer input section similar to that illustrated in FIG. 3, portions 11 and 11a, and may have output end 12 as in FIG. 1 with or without a relief portion as in FIGS. 2 and 3. This generally rectangular horn will have substantially the same dimensional relationships insofar as length between input and output ends and also transversely throughout the horn axis. The horn in FIG. 4 is provided with a groove 20 which may be substantially rectangular in cross section with filleted corners.

It is understood that horns having other geometrical shapes transversely to the horn axis may be used, such shapes generally following conventional geometrical configurations as ellipses or polygonal cross sections. The application of the invention to such various large horns is simply to control the output amplitude characteristics.

In connection with the design and manufacture of a large horn utilizing the present invention, it will be found that the addition of a groove may tend to change the horn length. In such event, it is desirable to provide some excess length of horn along the axis for removal of horn material. It would therefore be desirable to check resonance characteristics as horn material along the horn length is removed.

Examples of the application of the invention to a large horn with numerical and statistical data follows.

TABLE I

DATA FOR ROUND HORNS WITHOUT GROOVE
Material: Aluminum 7075T651
transducer: diameter = 1.812 inches; nominal amplitude at outside edge of output face = .0006 inches

| Dia. inches | Length inches | resonant frequency cps | amplitude (longitudinal) at output face (inches) | | | |
|---|---|---|---|---|---|---|
| | | | outer edge | approx. distance in toward center | | |
| | | | | 1/3 | 2/3 | center |
| 4.0 | 4.690 | 19,980 | .00036 | .00055 | .00055 | .00060 |
| 5.0 | 4.295 | 19,930 | .00015 | .00030 | .00045 | .00060 |
| 6.0 | 3.800 | 19,945 | .00010 | .00015 | .00020 | .00040 |

Table I deals with round horns without grooves and shows amplitude distribution for horns of three different diameters: 4 inches, 5 inches, and 6 inches. Note that for each diameter the amplitude is smallest at the outside edge and increases toward the center, and that this effect is increasingly evident as the horn diameter increases from 4 inches to 6 inches.

TABLE II

DESIGN DATA FOR ROUND HORNS USING ½" WIDE GROOVE
Material: Aluminum 7075T651
(FIG. 1A dimensions: w = .500 inches; r = .250 inches)

| No. | overall dims. | | groove dim. | groove depth | output face relief | | | |
|---|---|---|---|---|---|---|---|---|
| | d inches | l inches | s inches | g inches | e inches | f inches | n inches | m inches |
| 1 | 4.0 | 4.325 | 2.75 | .375 | | | | |
| 2 | 4.0 | 4.090 | 2.75 | .500 | | | | |
| 3 | 4.0 | 4.350 | 2.75 | .375 | | 3.900 | .031 | |
| 4 | 5.0 | 4.165 | 2.75 | .375 | | | | |
| 5 | 5.0 | 3.920 | 2.75 | .500 | | | | |
| 6 | 5.0 | 3.790 | 1.75 | .375 | 4.600 | 2.000 | .687 | 3.00 |
| 7 | 5.0 | 3.790 | 1.75 | .375 | 4.025 | 3.290 | .610 | 3.00 |
| 8 | 6.0 | 5.000 | 2.25 | .375 | | | | |
| 9 | 6.0 | 5.000 | 2.25 | .375 | 5.000 | 4.000 | .625 | 3.75 |
| 10 | 7.0 | 5.250 | 2.50 | .250 | 6.000 | 1.750 | .937 | 4.00 |

Table II gives dimensional information on a group of 10 actual horns with grooves (examples numbered 1 through 10). Note that some of these horns (Nos. 1, 2, 4, 5 and 8, corresponding to FIG. 1) have flat output surfaces, while others (Nos. 6, 7, 9 and 10, corresponding to FIG. 2) have output surfaces with reliefs to clear projections on the plastic workpieces. Horn No. 3 is similar to that shown in FIG. 2, except that the output end does not have a reduced diameter portion.

TABLE III

PERFORMANCE DATA FOR ROUND HORNS USING ½" WIDE GROOVE
transducer: diameter = 1.812 inches; nominal amplitude at outside edge of output face = .0006 inches.

| No. | resonant frequency cps | amplitude (longitudinal) at output face (inches) | | | |
|---|---|---|---|---|---|
| | | outer edge | approx. distance in toward center | | center |
| | | | ⅓ | ⅔ | |
| 1 | 19,950 | .00060 | .00065 | .0005 | .0005 |
| 2 | 19,980 | .00120 | .00075 | .00035 | .0004 |
| 3 | 19,960 | .00060 | .00050 | .0004 | .0005 |

TABLE III-continued

PERFORMANCE DATA FOR ROUND HORNS USING ½" WIDE GROOVE
transducer: diameter = 1.812 inches; nominal amplitude at outside edge of output face = .0006 inches.

| No. | resonant frequency cps | amplitude (longitudinal) at output face (inches) | | | |
|---|---|---|---|---|---|
| | | outer edge | approx. distance in toward center | | center |
| | | | ⅓ | ⅔ | |
| 4 | 19,990 | .00050 | .00040 | .0003 | .0003 |
| 5 | 19,940 | .00140 | .00035 | .0002 | .0001 |
| 6 | 19,560 | .00080 | .00040 | | |
| 7 | 19,830 | .00100 | | | |
| 8 | 20,050 | .00070 | .00030 | .0003 | .00065 |
| 9 | 20,010 | .00085 | | | |
| 10 | 20,110 | .00090 | | | |

Table III gives the measured performance data for the 10 horns detailed in Table II, and the examples are numbered in accordance with Table II.

The amplitude distribution for each diameter from 4 inches to 6 inches can be compared with the performance of ungrooved horns of the same diameter as shown in Table I. Note that in each case the grooved horn shows a substantial increase in the amplitude at the outer edge. Indeed, for most of the horns in Table III the amplitude at the outer edge of the working face is greater than the transducer driving amplitude of 0.0006 inch; i.e. the peripheral groove produces amplitude gain at the outer edge of the working face. It should be kept in mind that with practically large diameter horns for plastic welding, maximum amplitude is desired around the outer edge of the working face.

TABLE IV.

EFFECT OF GROOVE DEPTH ON AMPLITUDE OF ROUND HORNS USING ½" WIDE GROOVE
Data shown is the amplitude (longitudinal) at outer edge of the output face.
Material: Aluminum 7075T651
(FIG. 1A dimensions: w = .500 inches; r = .250 inches)
transducer: diameter = 1.812 inches; nominal amplitude at outside edge of output face = .0006 inches.
Resonant frequency of horns: 20 kHz (nominal)

| groove depth inches | 4.0 inches Dia. | | 5.0 inches Dia. | | 6.0 inches Dia. | |
|---|---|---|---|---|---|---|
| | amplitude inches | length inches | amplitude inches | length inches | amplitude inches | length inches |
| .250 | .00048 | 4.560 | .00025 | 4.260 | | |
| .375 | .00060 | 4.325 | .00050 | 4.165 | .00070 | 5.000 |
| .437 | | | | | .00065 | 4.700 |
| .500 | .00120 | 4.090 | .00140 | 3.920 | .00044 | 4.350 |

TABLE IV.-continued
EFFECT OF GROOVE DEPTH ON AMPLITUDE OF ROUND HORNS USING ¼" WIDE GROOVE Data shown is the amplitude (longitudinal) at outer edge of the output face.
Material: Aluminum 7075T651
(FIG. 1A dimensions: w = .500 inches; r = .250 inches)
transducer: diameter = 1.812 inches; nominal amplitude at outside edge of output face = .0006 inches.
Resonant frequency of horns: 20 kHz (nominal)

| | 4.0 inches Dia. | | 5.0 inches Dia. | | 6.0 inches Dia. | |
|---|---|---|---|---|---|---|
| groove depth inches | amplitude inches | length inches | amplitude inches | length inches | amplitude inches | length inches |
| .550 | | | .00220 | 3.720 | | |

Notes:
"groove depth" is FIG. 1A dim. g
"length" is FIG. 1 dim. l
"Dia." is FIG. 1 dim. d
FOr 4.0 inches Dia. horns, FIG. 1 dim. s = 2.75 inches.
For 5.0 inches Dia. horns, FIG. 1 dim. s = 2.75 inches.
For 6.0 inches Dia. horns, FIG. 1 dim. s = 2.25 inches.

For horns of each diameter shown, as the groove depth is altered so as to effect an increase in amplitude at the outer edge of the output face, the pattern of amplitude distribution across the output face also changes.

Some of the measurements tabulated in Table IV relate to experimental high amplitude horns which may operate at high stress levels. For more conservative design information refer to Table II.

What is claimed is:

1. An ultrasonic transmitting member having an input at one end and an output at the other end, said member being of metal and dimensioned to operate at ½ wavelength resonance in the order of 20 kHz and having substantially throughout the length thereof transverse dimensions of from about 4 inches to about 7 inches, said member being adapted to normally transmit acoustic energy longitudinally thereof between input and output ends, said member having a peripheral groove at its outer side surface extending inwardly from such outer surface to define the groove depth and said groove extending in planes transversely of the longitudinal axis of such member, said groove having its width in the direction of said longitudinal axis and its depth normal to the outer side surface of said member, said depth being between about ¼ inch and about ½ inch, said groove being located generally near or within the output half of said member and wholly spaced from the output end thereof by a distance of at least ¼ inch and acting to distribute output sonic energy at the output end of said member in substantial amplitude at the outermost regions of said output end.

2. The transmitting member according to claim 1 wherein said member has generally similar cross-sectional configuration in planes normal to the longitudinal axis of said member.

3. The transmitting member according to claim 2 wherein the inner surface of said groove is rounded in cross-section along a plane containing said longitudinal axis.

4. The transmitting member according to claim 3 wherein said groove has a width on the order of about ½ inch.

5. The transmitting member according to claim 1, wherein said member is substantially circular in transverse cross section.

6. The transmitting member according to claim 1, wherein said member is substantially rectangular in transverse cross section at the output end thereof.

7. The transmitting member according to claim 1, wherein said groove has a substantially cylindrical inner surface coaxial with said member and frustoconical side surfaces diverging outwardly from said inner surface.

8. The transmitting member according to claim 6, wherein said groove is generally rectangular in cross section along a plane containing said longitudinal axis.

9. The transmitting member according to claim 1, wherein said output end has a recess formed therein centrally thereof.

10. The transmitting member according to claim 5, wherein said output end has a reduced diameter end portion with a circular end surface, said circular end surface having a recess formed therein centrally thereof.

11. An ultrasonic transmitting member having an input end and an output end and a longitudinal axis extending therebetween and adapted for transmission of ultrasonic acoustic energy from said input end to said output end, said member having a peripheral outer side surface disposed between said input and output ends, said side surface having a peripheral groove therein extending therearound coaxially with said member and having a width extending axially of said member and a depth extending laterally inwardly of said member substantially normal to the longitudinal axis thereof, said groove acting to distribute output acoustic energy at said output end of said member so that said output energy has a substantial amplitude at the peripheral region of said output end.

* * * * *